UNITED STATES PATENT OFFICE.

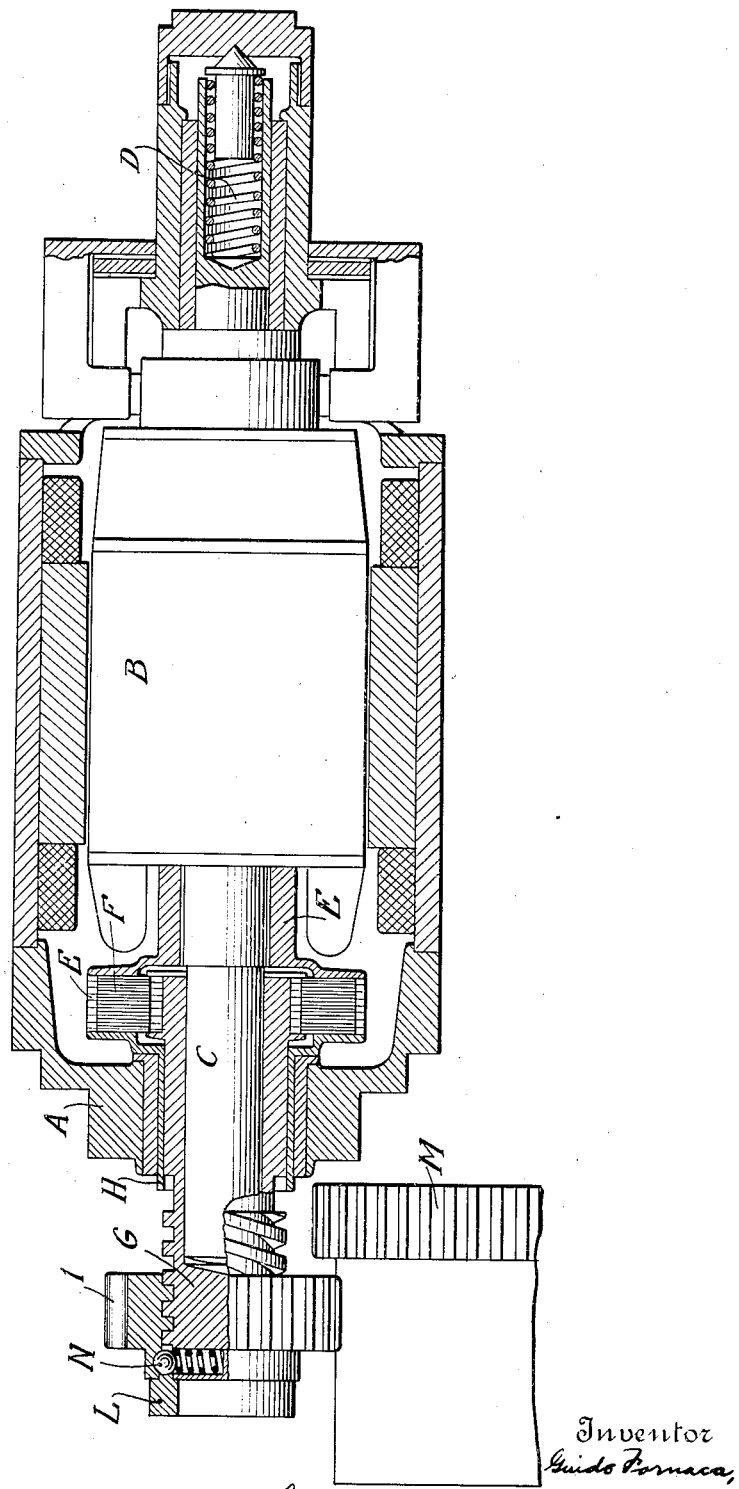

GUIDO FORNACA, OF TURIN, ITALY, ASSIGNOR TO F. I. A. T. (FABBRICA ITALIANA AUTOMOBILI TORINO), A CORPORATION OF ITALY.

MECHANISM FOR GEAR-MESHING.

1,245,452.     Specification of Letters Patent.     Patented Nov. 6, 1917.

Application filed May 8, 1916. Serial No. 96,227.

*To all whom it may concern:*

Be it known that I, GUIDO FORNACA, a subject of the King of Italy, residing in Corso Dante 30, Turin, Italy, have invented certain new and useful Improvements in Mechanism for Gear-Meshing, of which the following is a specification.

This invention relates to gears, and the object of this invention is to provide a device by means of which there is obtained an automatic and gradual, viz. shockless, engagement of two gears one of which is mounted on a shaft rotating at high speed. This aim is obtained through the use of a clutch acting in two periods, viz. in the first period transmitting a force only sufficient to cause the gears which are to engage to approach, and in the second period, after the engagement of the gears, transmitting a force proportional to the force to be transmitted.

This device may have several applications, one of which is the starting up of internal combustion engines by means of electric motors where the pinion fixed on the motor shaft of the electric motor must engage with the toothed rim of the flywheel of the engine to be started.

In the figure of the annexed drawing an example of this very application has been illustrated in longitudinal sectional view of a self-starter motor and gears with parts broken away, this being an application of the invention which with modifications and alterations purely constructive and within the range of every engineer may be applied to every other case where it may prove useful.

On the end of the shaft C, on which is fixed the armature B of the electric motor, is mounted a loose sleeve G provided on the outside with threads of large pitch. This sleeve G is driven from the shaft C through a multiple disk clutch F, whose driven disks slidable on keys at the end of the sleeve G receive their movement from the driving disks attached to the sleeve E fixed on the motor shaft C.

The clutch plate H maintains adherence between the driven and driving disks of the clutch owing to the pressure exerted by the spring D expanding between the motor framework A and the motor shaft C and pressing the shaft C and its sleeve E to the left.

The pressure of spring D is adjusted so that the clutch disks will be lightly pressed together and transmit to the driven sleeve G only a very small portion of the force which may be supplied by the electric motor, *i. e.* only the amount of force sufficient to cause this piece to rotate, while for greater forces the clutch slips.

When current is supplied to the electric motor the armature B begins to rotate and drives the sleeve G through the clutch F. The toothed pinion I which is freely threaded onto the piece G is held against rotation by inertia and is moved axially by the threads of the sleeve G so that its teeth engage with the teeth of the rim M attached to the flywheel of the engine to be started. As the pinion I has its teeth slid into mesh with the teeth of the rim M at the end of its travel it presses against the hub of the clutch plate H causing the plate H to move to the right and compress the disks of the clutch, the pinion I being held against rotation by the teeth of rim M. The tightening of the clutch continues until the resistance of the rim M is overcome and then the clutch F and the pinion I may transmit to the rim M all the force which the electric motor is capable of developing.

As soon as the engine is started the toothed rim M rotates more rapidly than the pinion I and consequently this pinion I unscrews itself going immediately back to its resting position resting against the ring L.

The pinion I is kept in said position during the inactivity by a ball stopping device N controlled by springs engaging in a groove made inside of the hub.

Of course, as stated above, the above described device may receive constructive modifications according to the different applications in which it is used, but all comprised in the principle of the invention.

Having thus described my invention, I declare that what I claim as new and desire to secure by Letters Patent, is:—

1. The combination with a driving and a driven member one of which is mounted on a shaft adapted to rotate at high speed, of means for effecting the automatic and gradual driving engagement of said members, comprising a clutch, means for first transmitting only enough power through said clutch to said members to move said members into driving engagement, and means effective upon engagement of said members for automatically increasing the power transmitted through said clutch to said members to an amount equal to that which must be transmitted between said members.

2. The combination with a driving and a driven gear one of which is mounted on a shaft adapted to rotate at high speed, of means for effecting the automatic and gradual driving engagement of said gears, comprising a clutch, means transmitting limited power through said clutch to said gears during their approach, and means for automatically increasing the power transmitted to said gears when they are brought into driving engagement.

3. The combination with a driving shaft having a gear, and a driven shaft having a coöperating gear, said gears being relatively movable to engage and disengage, of means for engaging said gears, and friction means for automatically limiting the power transmitted by one to the other during the engaging movement.

4. The combination with a driving shaft having a gear, and a driven shaft having a coöperating gear, said gears being relatively movable to engage and disengage, of means for engaging said gears, friction means for automatically limiting the power transmitted by one to the other during the engaging movement, and means for automatically increasing the power at the end of the engaging movement.

5. The combination with a driven gear and a driving gear therefor, of operating means for said driving gear comprising a support for said driving gear permitting rotation and bodily movement thereof into meshing engagement with said driven gear, driving means for said driving gear including a clutch, and means automatically actuating said clutch to drive said gears upon movement of said driving gear into mesh with said driven gear.

6. In combination with a driven gear and a driving gear therefor adapted to be brought into driving engagement with each other, means for rotating said driving gear comprising a clutch, and a clutch control device actuated by the driving gear in moving into driving engagement with said driven gear to render said clutch effective to transmit full driving power to said driving gear.

7. The combination with a driving and a driven shaft, of a releasable slide gear connection between said shafts, comprising a gear having limited rotation relatively to its shaft, a clutch between said gear and the source of power, and means for automatically disengaging said gears when the driven shaft reaches a predetermined speed.

8. The combination with an engine shaft having a gear thereon, of a starting motor shaft having a gear, said gears being relatively movable to engage and disengage and one of said gears having limited rotation on its shaft, and a clutch controlled by said gear at the limit of its rotation for transmitting power between said shafts.

9. The combination with an engine shaft having a gear thereon, of a starting motor shaft having a gear, said gears being relatively axially movable to engage and disengage and one of said gears having limited rotation on its shaft, and a clutch controlled by said gear at the limit of its rotation for transmitting power between said shafts.

In witness whereof I have hereunto signed my name in the presence of two subscribing witnesses.

GUIDO FORNACA.

Witnesses:
 NOAH WHITESTONE,
 REMA REIJ.